Aug. 6, 1957
H. S. GASS
2,801,895
INTERLOCKED-JOINT STRUCTURES
Filed Aug. 23, 1954
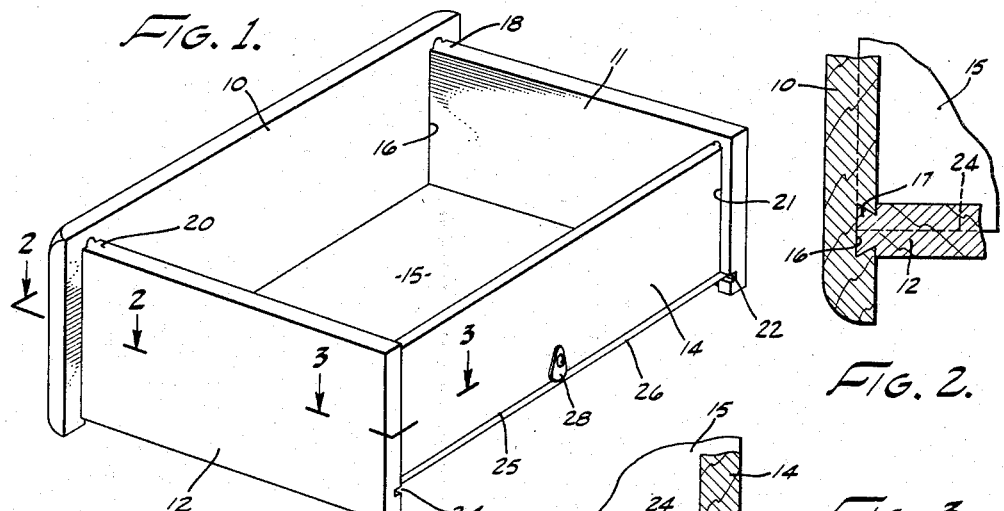
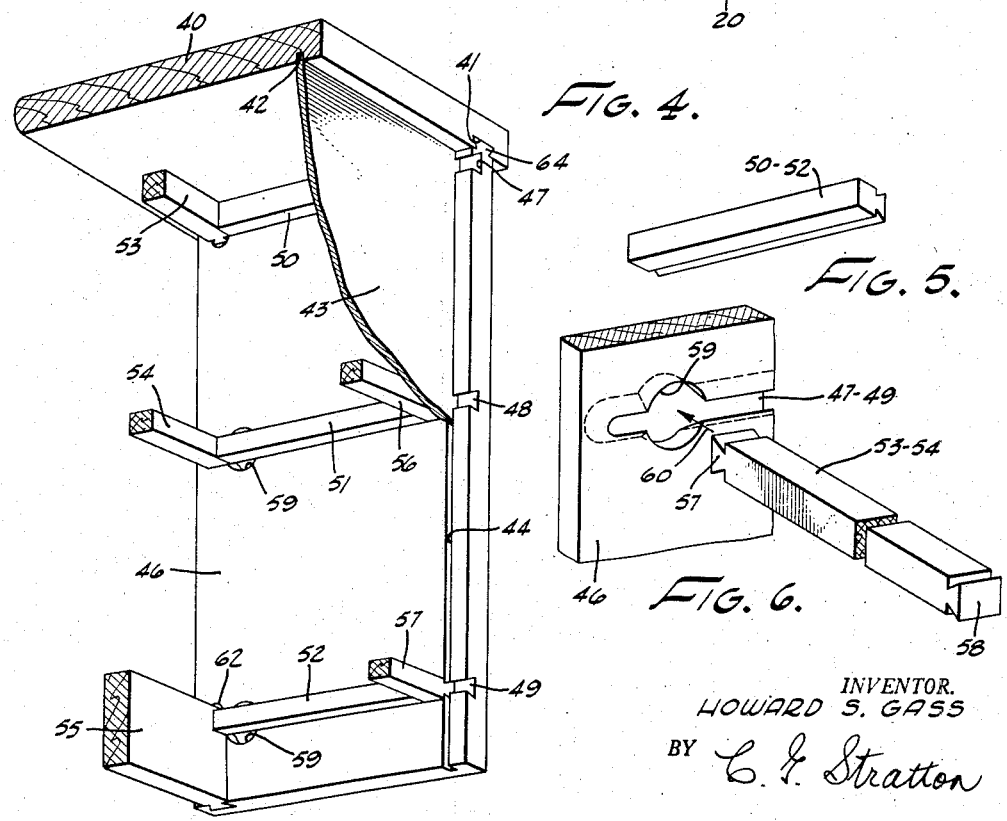
INVENTOR.
HOWARD S. GASS
BY C. I. Stratton
ATTORNEY

United States Patent Office 2,801,895
Patented Aug. 6, 1957

2,801,895

INTERLOCKED-JOINT STRUCTURES

Howard S. Gass, Corona, Calif., assignor of fifty percent to Walter A. Duckworth, Los Angeles, Calif.

Application August 23, 1954, Serial No. 451,507

3 Claims. (Cl. 312—257)

This invention relates to new and useful improvements in interlocking cabinet joints and structures which do not require glue or nails for retaining these joints and structures in locked or interlocked or assembled positions.

It is an object of this invention to provide interlocking cabinet joints and structures which, when assembled in a predetermined order or sequence, form interlocked or mutually locking elements or structures.

An additional object of this invention is to provide a plurality of structural elements insertable into a single groove and a locking element for holding all of said elements in a locked positioned in said groove.

Still another object of this invention is to provide said groove with an antechamber for inserting certain of said structural elements into said groove through said antechamber.

The invention also has for its objects to provide such means that are positive in operation, convenient in use, easily installed in a working position and easily dismantled whenever it is necessary to ship the disclosed elements, economical to manufacture, relatively simple to construct, assembly and dismantle because of the absence of any glued or nailed joints, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a perspective view of a drawer utilizing the interlocked joints construction.

Figs. 2 and 3 are sectional plan views of two corners of the drawer illustrated in Fig. 1, taken in planes 2—2 and 3—3, respectively, illustrated in Fig. 1.

Fig. 4 is a perspective view, partly in section, of the interlocked joints construction applicable to a structure having a plurality of structural elements, mounted in several planes.

Fig. 5 is a perspective view of a bracket member.

Fig. 6 is a perspective view of a cross-bracket member and a side member provided with an antechamber and a dovetail groove.

Referring to Fig. 1, the interlocked joints construction is illustrated, by way of an example, in connection with a conventional drawer having a front member 10, side members 11 and 12, a rear member 14, and a bottom member 15. The front member has blind end dovetail grooves 16 illustrated in Fig. 2, and the side members 11 and 12 have corresponding dovetail tenons 17, the tenons and the grooves forming conventional dovetail groove and tenon connection. However, since the grooves terminate in blind ends at the upper ends of the grooves, as illustrated in Fig. 1, when the sides 11 and 12 are inserted into the grooves, their upper edges 18 and 20 abut against the blind ends of the front member 10. A similar structure or joints is used between the rear member 14 and the rear ends of the sides 11 and 12, i. e., the dovetail grooves 21 terminate in blind ends with the result that the rear panel 14, when inserted from the bottom to the top of the grooves, as viewed in Fig. 1, the upper edges of the rear panel abut against the blind ends of the grooves.

Side panels 11 and 12 and front panel 10 have either rectangular grooves 22—24 or dovetail grooves, which are positioned directly below the lower edge 25 of rear panel 26 when the latter is inserted all the way up to the blind ends of the grooves 20. The bottom member or panel 15 has tenons fitting into the grooves 22—24, or if it is a thin plywood member, the tenons may be dispensed with and the edges of the bottom member are then inserted directly into the grooves. This is the structure illustrated in Fig. 1. A rotatable latch 28 is mounted on the rear member 14, and when it is turned it prevents bottom 15 from sliding out of grooves 22—24. Turning of latch 28 interlocks all joints in the following manner: bottom 15 is prevented from sliding out by latch 28, and sides 11 and 12 and rear wall 14 are prevented from sliding out by bottom 15.

Figs. 4, 5 and 6 illustrate an application of the interlocked joints construction to an outer frame which may be used for shelving or as a frame, including top, sidewalls and rear wall, for a chest of drawers. The top 40 is provided with two dead-end side grooves 41 (only one groove is visible in Fig. 4) and a groove 42 for accommodating the rear wall 43. Groove 42 is also a dead-end groove extending from one end of top 40 up to groove 44 in a side-wall 46. The rear wall 43 corresponds to the bottom panel 15 in Fig. 1 and acts as a locking member for holding all the remaining members in place. Sidewall 46 has a plurality of horizontal dead-end dovetail grooves 47, 48 and 49 which are used for accommodating members such as bars, cleats or rails 50, 51, 52, 53, 54, a front bottom panel 55 and cross-bars, cleats or rails 56 and 57. The perspective view of bars 50, 51 and 52 is illustrated in Fig. 5, and the perspective view of bars 53 and 54 is illustrated in Fig. 6. This bar has dovetail tenons 57 and 58 at its ends which fit into the dovetail deadend grooves 47 or 48 provided in the side-wall 46 in the manner illustrated in Fig. 4. The side-walls may be provided with antechamber bores or orifices 59 having sufficiently large diameter to slide tenons 57 or 58 into the bores, as illustrated by an arrow 60, and then into and along the dovetail groove 47 or 48. These bores may be used for the insertion of the cross-members 53 and 54 into the dovetail grooves by using these bores rather than the entire length of the grooves 47 and 48.

The bottom front panel 55 is locked in place by means of a dead-end groove 62 and a groove-tenon joint between panel 55 and cleat 52, as illustrated in Fig. 4. The entire structure is held in a locked or interlocked relationship by means of the rear panel 43, which is the last element that is slid into place after all other members have been slid into their proper positions. This can be accomplished by first sliding tenons 64 of side panels 46 along grooves 41, then sliding into place cross-members 53 and 54, then sliding in cleats 50 and 51, then the bottom panel 55, cleat 52, cross-cleats 56, 57 and finally, rear panel 43 which holds all members of the structure in their proper relationship with respect to each other. Panel 43 then may be locked in place by means of a latch similar to latch 28 (not illustrated in Fig. 4) to side-panels 46 or any one of the cross-cleats 56 or 57.

From the above description it follows that the disclosed structures can be manufactured at some distant point, packed in dismantled condition in compact packages, shipped to some distant point, and assembled quite readily by an unskilled person without using any glued or nailed joints.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A wooden shelf structure including top and side panels, two dead-end dovetail grooves recessed in the bottom surface of said top panel and parallel to the side edges thereof, said side panels each having one end terminating in a dovetail tenon forming a sliding engagement with the groove in said top panel and abutting against the respective dead-end of said groove, a front bottom panel having two dovetail tenons along the two side ends of said panel, a dead-end dovetail groove recessed in the inner surface of each of said side panels along the front edge thereof and extending from the bottom edge of said side panels, the tenons of said front bottom panel forming a sliding fit with said last dovetail grooves, a transverse dovetail groove extending from the rear edge of said side panels up to said last dovetail grooves, a pair of cleats having dovetail tenons on one side fitting into said transverse grooves, there being an interlocking joint between said cleats and said front panel for holding the same in tight non-sliding engagement with said side panels, a rectangular groove recessed in the inner surface of said top and side panels, respectively, to form three grooves lying in a single plane parallel to and inwardly displaced off the rear edge of said top and side panels, and a rear panel forming a sliding engagement with said three grooves, said rear panel locking said top and side panels in locked engagement with respect to each other and in tight abutting engagement against the dead-ends of the grooves of said top panel, and also locking said cleats in locked position with respect to said side panels.

2. A wooden shelf structure as defined in claim 1, which also includes a plurality of additional dead-end dovetail grooves recessed in the inner surface of said side panels, said grooves being perpendicular to the vertical edges of said side panels, and a corresponding plurality of cleats having dovetail tenons in sliding engagement with the respective additional dovetail grooves, said rear panel locking said cleats in locked position with respect to said side panels.

3. A wooden shelf structure as defined in claim 1, which also includes a bore concentric with each one of said additional grooves, and a transverse cleat having dovetail tenons at the ends thereof insertable into said additional grooves through said bore, whereby said transverse cleat extends between said side panels.

References Cited in the file of this patent

UNITED STATES PATENTS

| | | |
|---|---|---|
| 242,026 | O'Connor | May 24, 1881 |
| 325,049 | Brolaski | Aug. 25, 1885 |
| 653,514 | Kasschau | July 10, 1900 |
| 713,655 | Lawson | Nov. 18, 1902 |
| 786,940 | Amsden | Apr. 11, 1905 |
| 873,496 | Bryant | Dec. 10, 1907 |
| 2,065,133 | Heppenstall | Dec. 22, 1936 |
| 2,510,243 | Mohring | June 6, 1950 |
| 2,604,213 | Bales et al. | July 22, 1952 |